United States Patent [19]

Rittler

[11] Patent Number: 4,952,388
[45] Date of Patent: Aug. 28, 1990

[54] METHOD OF TREATING PHYLLOSILICATES

[75] Inventor: Hermann L. Rittler, Corning, N.Y.

[73] Assignee: Corning Incorporated, Corning, N.Y.

[21] Appl. No.: 405,273

[22] Filed: Sep. 11, 1989

Related U.S. Application Data

[63] Continuation-in-part of Ser. No. 167,182, Mar. 11, 1988, abandoned.

[51] Int. Cl.$^5$ .................. B01J 20/12; C01B 33/26; C04B 20/02
[52] U.S. Cl. ....................... 423/327; 252/378 R; 423/132; 501/146; 501/148; 502/410
[58] Field of Search ............... 423/132, 327; 501/146, 501/148; 502/410; 428/363, 454; 252/378 R

[56] References Cited

U.S. PATENT DOCUMENTS

| | | | |
|---|---|---|---|
| 3,414,422 | 12/1968 | Ianicelli et al. | 501/146 |
| 3,531,410 | 9/1970 | Taylor | 252/378 R |
| 3,813,346 | 5/1974 | Wada et al. | 252/378 R |
| 4,400,297 | 8/1983 | Cruz, Jr. | 252/378 R |
| 4,676,929 | 6/1987 | Rittler | 501/148 |
| 4,715,987 | 12/1987 | Rittler | 501/148 |
| 4,786,620 | 11/1988 | Rittler | 501/141 |
| 4,826,628 | 5/1989 | Rittler | 501/145 |

FOREIGN PATENT DOCUMENTS 273373 6/1927 United Kingdom ............... 501/146

OTHER PUBLICATIONS

Berry et al., *Mineralogy*, W. H. Freeman and CO., 1959, pp. 469, 499, 504.
CRC Handbook of Chemistry and Physics, 62nd ed., West et al., eds. CRC Press, Inc., 1981, pp. D-125 to D-127.

*Primary Examiner*—Jeffrey E. Russel
*Attorney, Agent, or Firm*—Clinton S. Janes; Milton M. Peterson

[57] ABSTRACT

There is disclosed a method of treating phyllosilicate materials by exposing the materials to a source of hydrogen ions to hydrate hydroxyl ions on and in the phyllosilicate structure. The source of hydrogen ions may be a simple organic, or mineral, acid, preferably formic or hydrochloric acid. The hydrated phyllosilicate may then be dehydrated and delaminated by thermal treatment.

13 Claims, 1 Drawing Sheet

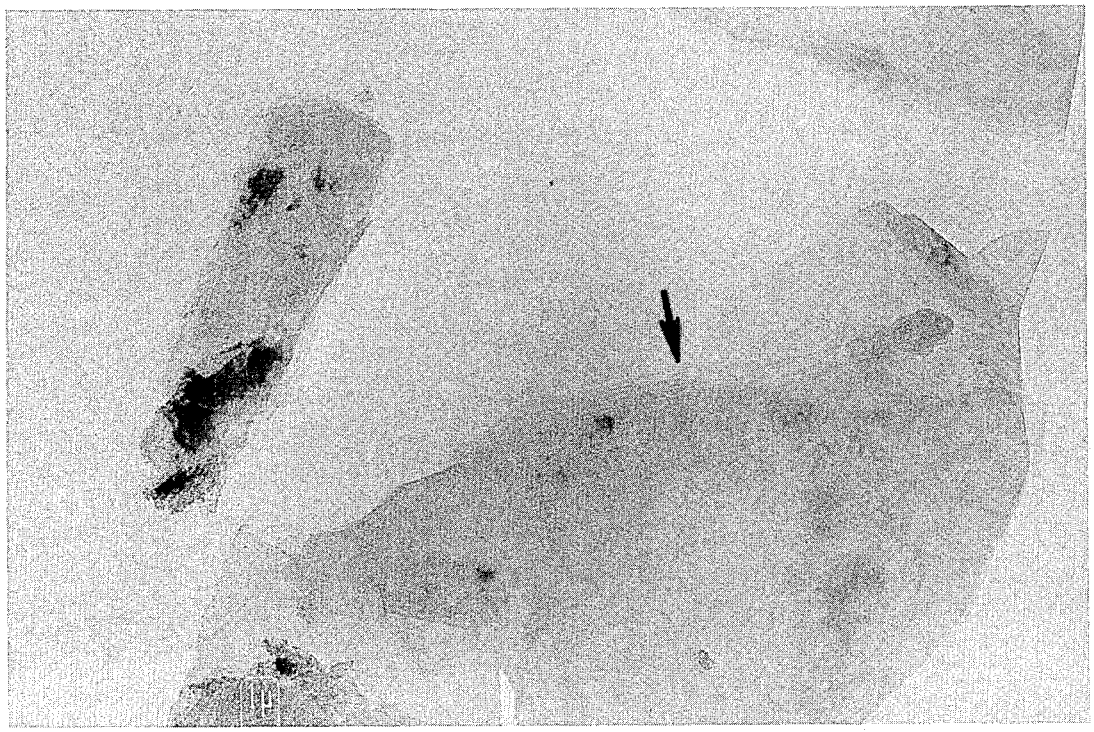

METHOD OF TREATING PHYLLOSILICATES

This application is a continuation-in-part application of Ser. No. 167,182 filed Mar. 4, 1988, now abandoned.

BACKGROUND OF THE INVENTION

This invention is concerned with phyllosilicate materials, and with a novel method of treating such materials. It is particularly concerned with a method of hydrating such materials so that they can be delaminated to essentially unit cell dimensions.

Essentially any phyllosilicate, whether of natural or synthetic origin, may serve as a starting material. However, the natural materials are generally of greater interest from an economic standpoint. The silicate minerals of interest include vermiculite, beidellite, nontronite, volchonskoite, saponite, stevensite, hectorite, the smectites, attapulgite, sepiolite, phlogopite and biopyrobole.

Sheet silicates of the mica type are built of two units, viz., a tetrahedral sheet and an octahedral sheet. The former consists of tetrahedra of Si—O linked together to form a hexagonal network such that the bases thereof are coplanar and the apices thereof point in the same direction. This configuration yields a Si:O ratio of 2:5. In contrast, the octahedral sheet is generated through the impingement of two tetrahedral sheets pointing toward each other and crosslinked by the sharing of oxygens by Mg (or Al, Fe) in octahedral coordination. The two octahedral corners not falling in the plane of apical oxygens are occupied by hydroxyl or fluoride ions.

It is possible that a composite sheet formed in this manner will be electrically neutral. In that case, Van der Waals-type forces bond it to the sheets immediately above and below. More commonly, however, an excess negative charge exists due either to ion substitutions, or unoccupied sites (vacancies), or a combination of both. Differences in properties arise from the degree of charge deficiency as well as the location of the excess charge. Charge balance is restored through the uptake of foreign cations in interlayer positions in 12-fold coordination due to hexagonal rings of oxygens located in the sheets above and below.

In order to create a product from vermiculite, it is usually necessary to delaminate the particles. This involves separating the crystals at the interlayer to form high aspect ratio platelets. These may be suspended and subsequently deposited in any desired form, such as a sheet, or otherwise processed.

The silicate layer units in these minerals have a thickness of about 10 Angstrom units, with the main elemental constituents being Mg, Al, Si, and $O_2$. These silicate layers are separated by an interlayer composed of water molecules associated with cations, such as $Mg++$, $Na+$, $K+$ and $H+$.

The three layer micas in general, and natural vermiculite in particular, have been extensively studied because of their potential for thermal resistance and electrical insulation. The interest has been heightened considerably with the recent flight from asbestos products.

Many of the phyllosilicates, however, tend to be quite hygroscopic. Various solutions to this problem have been proposed. For example, it is known that adsorbed water molecules and hydroxyl ions may be removed by thermal treatment. This can be very effective, particularly if carried out under reduced pressure. However, there is usually a strong tendency to rehydrate after the material cools and is exposed to ambient conditions.

For certain applications, a large surface area is highly desirable. This necessitates a high degree of delamination. The surface area in square meters per gram ($M^2$/gm.) of vermiculite as received is normally less than one. Even after pulverizing to pass a 270 mesh screen, the value is no more than 2-3 $M^2$/gm.

It is conventional practice to delaminate the layered silicates by heating to an elevated temperature. This causes the water-containing interlayer to expand and pop open. It has also been proposed to expand vermiculite particles by refluxing in an aqueous solution of a salt such as lithium chloride. Subsequent application of a shearing force causes the crystals to separate at the interlayer and form an aqueous gel.

RELATED LITERATURE

My U.S. Pat. No. 4,676,929 describes a method of delamination wherein a hydrated phyllosilicate is dispersed in an expanding agent. This may be a primary aminocarboxy acid, or lysine orotate, or glycylglycine. When accompanied by a shearing force, the expanding agent is effective to separate the silicate layer units of the phyllosilicate crystal in a matter of minutes, and form a gel at ambient temperature.

Reference is also made to my U.S. Pat. Nos. 4,715,987 and No. 4,786,620. The former describes subjecting a phyllosilicate to an ion exchange treatment before reacting it with an expanding agent in accordance with U.S. Pat. No. 4,676,929. The latter describes subjecting a phyllosilicate to an ion exchange treatment, plus a thermal treatment. This develops a new crystal phase which forms a solid solution.

My U.S. Pat. No. 4,826,628 describes a method of delaminating a phyllosilicate by heating the phyllosilicate in the presence of a reactive vapor phase. Preferably, this is a hydrogen-containing atmosphere, such as forming gas. The delaminated phyllosilicate is stabilized against moisture pickup, and may have a layer of transition metal, or organic reactive sites, formed on its surface.

U.S. Pat. No. 4,400,297 (Cruz, Jr.) discloses producing a modified, heat exfoliated, hydrated magnesium aluminosilicate in particulate form by treating the aluminosilicate with an aqueous acidic solution having a pH between 1.0 and 5.5, while simultaneously subjecting the mass to a controlled shearing action. The patent further discloses that when a non-heat exfoliated vermiculite was subjected to a similar acid and shearing treatment, the resulting material did not have the same appearance and did not form self-supporting sheets when dried.

PURPOSES OF THE INVENTION

A basic purpose is to provide a novel method of treating a phyllosilicate material to alter its physical and chemical characteristics.

Another purpose is to produce a phyllosilicate material that is essentially completely delaminated.

A further purpose is to prepare a phyllosilicate to be completely chemically functionalized.

Another purpose is to produce a dehydrated phyllosilicate.

Another purpose is to provide a method of phyllosilicate treatment whereby surface area may be varied from five to nearly 650 $M^2$/gm.

SUMMARY OF THE INVENTION

The method of my invention comprises delaminating a three-layer, mica phyllosilicate which consists in mixing, with mild stirring equivalent to magnetic stirring, the phyllosilicate with a source of hydrogen ions to hydrate hydroxyl ions within the phyllosilicate structure, whereby the phyllosilicate is delaminated to a particle thickness not over about 100 Angstrom units. The source of hydrogen ions may be an organic, or mineral, acid, preferably formic, or hydrochloric, acid. The delaminated material may be dried and heated to a temperature in the range of 100°–1000° C. to dehydrate the material and provide surface areas from five to nearly 650 $M^2$/gm.

DESCRIPTION OF THE INVENTION

I have found that exposure of a phyllosilicate to hydrogen ions causes hydration of hydroxyl ions (OH—) on and within the phyllosilicate. This action, coupled with mild stirring, such as magnetic stirring, may result in essentially complete delamination, that is down to unit cell size platelets without essential change in morphology. In the case of vermiculite, this is about 10 Angstrom units (Å) thickness.

The process involves exposing the phyllosilicate material to a source of hydrogen ions. Preferably, this involves immersion in a solution of a straight chain aliphatic, organic acid, or a mineral acid, for a period of time with moderate agitation. Thus, the mixture may be subjected to magnetic stirring for a period of four or more hours.

The acid employed must meet two primary conditions; namely, a high enough concentration of hydrogen ion, and an adequately small molecular size to enable penetration of the interlayer of the phyllosilicate. In the absence of buffering, it is generally desirable to have a hydrogen ion concentration in the range of 2 to 6, preferably about 3. Where a solution is buffered, as occurs when salts are formed with mineral acids, the pH may range higher of course.

Any of the short, straight chain, aliphatic, or simple aromatic, organic acids may be employed. These include, for example, formic, acetic and benzoic acids. More complex organic structures tend to either be ineffective, or to proceed too slowly. The degree of hydrogen ion concentration may be a factor. Also, the more complex structures may be unable to enter the interlayer of the phyllosilicate.

Any of the common mineral acids, such as HCl, $HNO_3$, $H_2SO_4$, HBr and $H_3PO_4$ may also be employed. However, these acids tend to form salts which may be only slightly soluble, and hence difficult to remove. For this reason, HCl is preferred.

It is also desirable to avoid acids that may either attack the phyllosilicate crystal structure, or react to leave a residue not readily removable. Accordingly, to fully meet these conditions, I prefer to employ either formic acid (HCOOH) or hydrochloric acid (HCl). The formate group readily disappears on heating, whereas chlorides, such as $MgCl_2$, are readily removed by washing. In contrast, larger organic groups may be difficult to remove. Also their size militates against entry into the interlayer. Other mineral salts such as sulfates may be much more difficult to remove by washing also.

After sufficient delamination has been obtained with an organic acid, the material may be separated, as by centrifuging, and dried by heating to about 300° C. This may produce a material having a surface area of about 70 $M^2$/gm., as measured by the nitrogen adsorption (BET) method. Depending on the materials employed, and the conditions of treatment, surface areas may vary from 5 to 640 $M^2$/gm. Chemical analyses show the original cation chemistry of the phyllosilicates to be essentially unaltered when an organic acid, such as formic acid, is employed.

It is my belief that the action of a hydrogen ion source, such as formic acid, is one of simple hydration. Thus, hydroxyl ions, whether adsorbed on the phyllosilicate surface, or in the interlayer, combine with the hydrogen ion to form water molecules. These, in turn, are subsequently eliminated when the hydrated material is heated at a modest temperature.

The action with a mineral acid, such as HCl, is somewhat different. It appears that hydroxyl ions are hydrated as was described for the organic acid reaction. In addition, however, it appears that interlayer cations, such as $Mg++$, $Ca++$ and $K+$ ions, are removed and form chlorides. Both $Al+^3$ and ferrous ions are removed from the octahedral layer to some degree. However, electron micrographs show the morphology of high aspect ratio plates remains unaltered.

It is believed that the reaction with a mineral acid, such as HCl, produces both hydration of hydroxyl ions to molecular water and metal chlorides. The latter may be easily removed by washing, and may be salvaged if desired. The molecular water may then be removed from the delaminated phyllosilicate by mild heat treatment as in the case of the formic acid treatment.

It is necessary to control the hydrogen ion concentration, particularly when using mineral acids such as HCl. Too strong a concentration, or too long a time of contact, may cause destruction of the unit cell structure due to excessive cleavage of bonds other than the cation-hydroxyl bonds. For example, if a stronger acid solution, or a heated solution, is used, the time of contact must be limited. In turn, if the particle size of the phyllosilicate is relatively large, somewhat stronger concentrations, or longer times, may be required. As a general rule, the time of contact may be from four hours to days depending on the factors indicated above. Likewise, the treating solution should not have a pH greater than about 6 unless buffered. The chemical reactions involved in the present methods may be illustrated by the following typical equations where M is a cation such as $Mg++$:

1. $2HCl + M(OH)_2 \rightarrow MCl_2 + 2H_2O \uparrow$     (1)

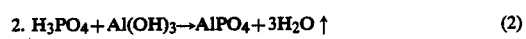

2. $H_3PO_4 + Al(OH)_3 \rightarrow AlPO_4 + 3H_2O \uparrow$     (2)

BRIEF DESCRIPTION OF THE DRAWING

The single FIGURE in the attached drawing is a reproduction of an electron photomicrograph of a phyllosilicate platelet produced by the method of the invention.

SPECIFIC EXAMPLES OF THE INVENTION

Examples 1–4

A batch of vermiculite material was divided into four portions. One was retained in the as received condition. Each of the other three was mixed with a source of hydrogen ion and magnetically stirred for several hours. The vermiculite was separated, washed if necessary, and then dried by heating to 300° C. The three sources of hydrogen ion were:
2 Formic acid (HCOOH)
3. HCl
4. Glycine-HCl The materials obtained from the three treatments, as well as the original material, were analyzed for surface area (S.A.) in $M^2$/gm. by the BET procedure. Also, wet chemical analyses were performed on each material, and the results reported in weight percent. The data are set forth below in TABLE I. Rem. represents the remaining components for which no specific analysis was made.

TABLE I

| Ex. | S.A. ($M^2$/gm.) | $SiO_2$ | $Al_2O_3$ | MgO | $Fe_2O_3$ | CaO | $K_2O$ | C | Rem. |
|---|---|---|---|---|---|---|---|---|---|
| 1. | <1 | 45 | 9 | 21.5 | 6 | 5 | 1 | 0.2 | 12.3 |
| 2. | 70 | 45 | 9 | 21 | 6 | 3 | 1 | 2 | 13 |
| 3. | 500 | 69 | 3 | 7 | 4 | 3 | 1 | — | 13 |
| 4. | 640 | 70 | 3 | 7 | 3 | 3 | 1 | — | 13 |

It is apparent that each treatment produced a dramatic increase in surface area, an indication of delamination. It is also apparent that formic acid had no appreciable effect on chemical composition, whereas the HCl solutions had a very marked effect.

Example 5

Approximately 100 grams of −270 mesh vermiculite was mixed into 4 liters of a 2M aqueous solution of formic acid (HCOOH) and magnetically stirred for several hours. The pH of the slurry was 3.11.

The solids were separated and washed thoroughly in distilled water twice. Following the washing, the solid material was dried, as was a sample of as received vermiculite. The two samples were then analyzed by X-ray diffraction. Characteristic peaks were noted on the two traces as follows:

| Ex. 5 | As Received |
|---|---|
| 14.26 | 14.33 |
| 3.59 | 3.60 |
| 2.88 | 2.89 |
| 1.54 | 1.54 |

These data indicated that, while hydration had occurred in the treated sample, the characteristic vermiculite structure remained unchanged.

Example 6

A vermiculite slurry was prepared as in Example 5, but using 4 liters of 2M HCl, instead of formic acid. The slurry was stirred for several hours, the solids were separated and washed three (3) times in distilled water to insure removal of chlorides. The washed solids were then heated at 300° C. overnite.

Following the heat treatment, the material was analyzed by X-ray diffraction as in Example 5. Characteristic peaks for vermiculite were noted, except that the 001 peak at about 14 Å was missing. This indicated that the platelets were less than ten cells or layers of single crystals (<100 Å) thick since there were not enough repeats to give the 001 line.

Subsequently, an electron photomicrograph was taken of the material at a magnification of 80,000X. A photographic reproduction is shown in the accompanying drawing. The arrow in this micrograph indicates the platelets are about five (5) layers of single crystals (50 Å) thick, a remarkable degree of delamination without alteration of the characteristic vermiculite structure. The distance between the two vertical bars in the lower left corner of the micrograph represents a length of one micron.

Example 7

Another vermiculite slurry was prepared as in Example 6, but using a different source of vermiculite. This slurry showed a pH of 2.543. After stirring for several hours, the solids were separated and washed three (3) times in distilled water as before to remove chlorides.

The washed solids were heated overnight at 300° C., and then analyzed by X-ray diffraction. The trace again showed the typical vermiculite peaks, indicating retention of the characteristic crystal structure. However, the 001 peak appeared, thus indicating that delamination had not proceeded below ten layers, that is about 100 Å.

Examples 8-10

A vermiculite slurry was prepared by mixing about 100 grams of −270 mesh vermiculite with 4 liters of a 2M solution of phosphoric acid ($H_3PO_4$). The mixture was magnetically stirred for several hours, the pH of the slurry being determined to be 2.712. The solids were then separated from the slurry and divided into three portions for further treatment.

One portion was heated overnight at 300° C. in air without any previous washing. A second portion was washed three times with distilled water, and then heated for one hour in air at 800° C. The third portion was washed twice in distilled water, and then heated at 300° C. overnight in air.

The three heat treated portions were then analyzed for surface area by the BET procedure. Also, chemical analyses were performed on the material of each portion. The data obtained are set forth below in TABLE II, the designations corresponding to those in TABLE I.

TABLE II

| Ex. | S.A. ($M^2$/gm.) | $SiO_2$ | $Al_2O_3$ | MgO | $Fe_2O_3$ | CaO | $P_2O_5$ | Rem. |
|---|---|---|---|---|---|---|---|---|
| 8. | 29 | 43.7 | 5.9 | 13.9 | 4.6 | 2.7 | 19.5 | 9.7 |
| 9. | 124 | 59.4 | 7.0 | 15.6 | 5.9 | 3.0 | 2.7 | 6.4 |
| 10. | 236 | 56.0 | 6.0 | 15.0 | 6.0 | 3.0 | 3.0 | 11.0 |

Of particular significance are the substantial surface areas, and the amount of phosphate retained in the unwashed portion.

Example 11

A vermiculite slurry was prepared as in Example 5, but using 4 liters of 2M acetic acid. After several hours magnetic stirring at 25° C., the solids were separated, washed in distilled water and dried overnite at 300° C. Surface area (S.A.), as determined by the BET procedure, was 6$M^2$/gm.

Example 12

Example 11 was repeated, using glacial acetic acid rather than the 2M solution. Surface area measurements on this sample showed 17 $M^2/gm$. As noted previously, surface area measurements on untreated vermiculite generally are less than one $M^2/gm$.

I claim:

1. A method of delaminating a three-layer, mica phyllosilicate which consists in mixing, with mild stirring equivalent to magnetic stirring, the phyllosilicate with a source of hydrogen ions to hydrate hydroxyl ions on and within the phyllosilicate structure, whereby the phyllosilicate is delaminated to a particle thickness not over about 100 Angstrom units.

2. A method in accordance with claim 1 wherein the phyllosilicate is mixed with the source of hydrogen ions by stirring the mixture with a magnetic stirrer.

3. A method according to claim 1 wherein the source of hydrogen ions is an acid solution.

4. A method according to claim 3 wherein the acid solution has a pH in the range of 2 to 6.

5. A method according to claim 3 wherein the acid solution is buffered.

6. A method according to claim 3 wherein the source of hydrogen ions is an aliphatic organic acid.

7. A method according to claim 6 wherein the organic acid is formic acid.

8. A method according to claim 3 wherein the source of hydrogen ions is a mineral acid.

9. A method according to claim 8 wherein the mineral acid is hydrochloric acid.

10. A method of delaminating a three-layer, mica phyllosilicate which consists in mixing, with mild stirring equivalent to magnetic stirring, the phyllosilicate with a source of hydrogen ions to hydrate hydroxyl ions on and within the phyllosilicate structure, and delaminating the phyllosilicate to plates having a thickness not over 100 Angstrom units with the morphology of said plates essentially unaltered and a surface area from five to 640 $M^2/gm$ when dried.

11. A method in accordance with claim 10 wherein the phyllosilicate is mixed with the source of hydrogen ions by stirring the mixture with a magnetic stirrer.

12. A method of delaminating a three-layer, mica phyllosilicate which consists in mixing, with mild stirring equivalent to magnetic stirring, the phyllosilicate with a source of hydrogen ions to hydrate ions on and within the phyllosilicate structure, whereby the phyllosilicate is delaminated to a particle thickness not over about 100 Angstrom units, and thereafter heating the hydrated material in the range of $100°-1000°$ C. to dehydrate the material.

13. A method according to claim 12 wherein the material is heated to about $300°$ C.

* * * * *